US008349506B2

United States Patent
Nonobe

(10) Patent No.: US 8,349,506 B2
(45) Date of Patent: Jan. 8, 2013

(54) FUEL CELL SYSTEM

(75) Inventor: Yasuhiro Nonobe, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 356 days.

(21) Appl. No.: 11/919,036

(22) PCT Filed: May 25, 2006

(86) PCT No.: PCT/JP2006/310435
§ 371 (c)(1), (2), (4) Date: Oct. 23, 2007

(87) PCT Pub. No.: WO2006/126629
PCT Pub. Date: Nov. 30, 2006

(65) Prior Publication Data
US 2009/0075135 A1    Mar. 19, 2009

(30) Foreign Application Priority Data
May 25, 2005  (JP) ................................. 2005-153169

(51) Int. Cl.
H01M 8/04    (2006.01)
(52) U.S. Cl. ......................................................... 429/427
(58) Field of Classification Search ........................ None
See application file for complete search history.

(56) References Cited

U.S. PATENT DOCUMENTS
7,195,035 B2 *  3/2007  Pechtold ................. 137/625.44
2003/0164202 A1 *  9/2003  Graham et al. ................. 141/98

FOREIGN PATENT DOCUMENTS
| DE | 100 21 681 C2 | 6/2002 |
| DE | 103 04 136 A1 | 8/2004 |
| JP | 2-049359 | 2/1990 |
| JP | 4-191191 | 7/1992 |
| JP | 2002-106791 A | 4/2002 |
| JP | 2002-213697 A | 7/2002 |
| JP | 2003-056799 A | 2/2003 |
| JP | 2003-187836 A | 7/2003 |
| JP | 2004-127817 A | 4/2004 |
| JP | 2005-038832 A | 2/2005 |

OTHER PUBLICATIONS

Machine translation of JP 2004-127817.*
Machine translation of JP 2002-213697.*

* cited by examiner

Primary Examiner — Patrick Joseph Ryan
Assistant Examiner — Wyatt McConnell
(74) Attorney, Agent, or Firm — Kenyon & Kenyon LLP

(57) ABSTRACT

The fuel cell system includes a storage portion, a fuel cell, a fuel supply portion, a hydrogen circulation system and a boil-off gas supply portion. The storage portion stores liquid hydrogen. The fuel cell uses hydrogen gas as fuel gas. The fuel supply portion provides hydrogen gas to an anode of the fuel cell. The hydrogen gas is generated caused by a vaporization of liquid hydrogen stored in the storage portion. The hydrogen circulation system includes the anode of the fuel cell. The boil-off gas supply portion provides boil-off gas generated in the storage portion to the hydrogen circulation system.

10 Claims, 4 Drawing Sheets

FUEL CELL SYSTEM

This is a 371 national phase application of PCT/JP2006/310435 filed 25 May 2006, claiming priority to Japanese Patent Application No. 2005-153169 filed 25 May 2005, the contents of which are incorporated herein by reference.

TECHNICAL FIELD

This invention generally relates to a fuel cell system that has a liquid hydrogen tank.

BACKGROUND ART

In general, a fuel cell is a device that obtains electrical power from fuel, hydrogen and oxygen. Fuel cells are being widely developed as an energy supply device because fuel cells are environmentally superior and can achieve high energy efficiency.

There are examined methods of providing hydrogen to the fuel cell, such as a method of providing hydrogen stored in a storage portion such as a high-pressure hydrogen tank, a hydrogen storing alloy tank or a liquid hydrogen tank. Liquid hydrogen is examined as a hydrogen supply for the fuel cell, because liquid hydrogen has high energy storing density and high hydrogen-charging efficiency to a storage portion.

However, boil-off gas is possibly generated because of vaporization of the liquid hydrogen, when the liquid hydrogen tank is heated from outside. The pressure in the liquid hydrogen tank increases when the boil-off gas is generated. It is, therefore, necessary to exhaust the boil-off gas, when necessary.

Patent Document 1 discloses a method of storing boil-off gas in a pressure container and providing the boil-off gas stored in the pressure container to the fuel cell at startup of the fuel cell. It is possible to use the boil-off gas for a fuel of the fuel cell.

Patent Document 1: Japanese Patent Application Publication No. 2003-56799

DISCLOSURE OF THE INVENTION

Problems to be Solved by the Invention

However, in a case of applying the method disclosed in the Patent Document 1 to a fuel cell system, it is necessary to provide a pressure container for containing the boil-off gas. Accordingly, the structure of the fuel cell system is complicated.

The present invention provides a fuel cell system that is capable of using the boil-off gas effectively and has a simplified system structure.

Means for Solving the Problems

A fuel cell system in accordance with the present invention is characterized by comprising a storage portion, a fuel cell, a fuel supply portion, a hydrogen circulation system and a boil-off gas supply portion. The storage portion stores liquid hydrogen. The fuel cell uses hydrogen gas as fuel gas. The fuel supply portion provides hydrogen gas to an anode of the fuel cell. The hydrogen gas is generated caused by a vaporization of the liquid hydrogen stored in the storage portion. The hydrogen circulation system includes the anode of the fuel cell. The boil-off gas supply portion provides boil-off gas generated in the storage portion to the hydrogen circulation system.

With the fuel cell system in accordance with the present invention, the liquid hydrogen is stored in the storage portion. The hydrogen gas generated caused by the vaporization of the liquid hydrogen stored in the storage portion is provided to the anode of the fuel cell by the fuel supply portion. The boil-off gas generated in the storage portion is provided to the hydrogen circulation system by the boil-off gas supply portion. In this case, it is restrained that the boil-off gas is exhausted to the outside, because the boil-off gas is provided to the hydrogen circulation system. It is, therefore, not necessary to provide a treatment device such as a diluting device of the boil-off gas exhausting to the outside. Accordingly, the structure of the fuel cell system is simplified. The fuel cell can use the boil-off gas for a fuel for the electrical power generation when the fuel cell generates the electrical power. It is, therefore, possible to use the boil-off gas effectively. It is possible to shut away the boil-off gas in the hydrogen circulation system, when the fuel cell does not generate the electrical power. And the fuel cell can use the boil-off gas as a fuel at next time of the electrical generation. It is, therefore, possible to use the boil-off gas effectively. Accordingly, it is possible to restrain reduction of energy efficiency of the fuel cell system.

The boil-off gas supply portion may have a first valve that provides the boil-off gas to the hydrogen circulation system when a pressure of the boil-off gas is more than a threshold value. In this case, it is restrained that the pressure in the storage portion is excessive. The boil-off gas supply portion may have a second valve that restrains a reflux of the boil-off gas into the storage portion from the hydrogen circulation system. In this case, it is restrained that the steam and so on included in anode-off gas flows into the storage portion. It is, therefore, possible to restrain the corrosion of the first valve.

The hydrogen circulation system may have a hydrogen circulating portion that circulates the hydrogen in the hydrogen circulation system. In this case, it is possible to control an amount of the hydrogen provided to the anode with the hydrogen circulating portion. A position of the hydrogen circulation system where the boil-off gas is provided to the hydrogen circulation system from the boil-off gas supply portion may be upstream of the hydrogen circulating portion in the hydrogen circulation system and downstream of the anode.

The hydrogen circulation system may have an exhaust portion that is provided upstream of the hydrogen circulating portion and downstream of the anode and that exhausts a gas in the hydrogen circulation system. In this case, it is possible to exhaust nitrogen and so on flowing into the anode from the cathode. A position of the hydrogen circulation system where the boil-off gas is provided to the hydrogen circulation system from the boil-off gas supply portion may be upstream of the hydrogen circulating portion and downstream of the exhaust portion. In this case, it is possible to restrain an exhaust of the hydrogen from the exhaust portion.

A position of the hydrogen circulation system where the boil-off gas is provided to the hydrogen circulation system from the boil-off gas supply portion may be middle of the anode. In this case, it is restrained that a density of the hydrogen is reduced on the outlet side of the anode. Accordingly, the electrical power is generated substantially equally at every area of the fuel cell.

The fuel cell system may include a pressure detection portion and a determination portion, the detection portion detecting a pressure in the hydrogen circulation system, the determination portion determining whether the boil-off gas is provided to the hydrogen circulation system when a value detected by the pressure detection portion is more than a threshold value. In this case, it is detected whether the boil-off gas is generated in the storage portion. The pressure detection portion may be provided downstream of the hydrogen circulating portion and upstream of the anode.

The fuel cell system may further include a hydrogen-circulation-amount controller that controls an amount of hydrogen flowing in the hydrogen circulation system. In this case, it is possible to control the amount of the hydrogen provided to the anode with the hydrogen-circulation-amount controller.

The hydrogen circulating portion may be a hydrogen pump. The hydrogen-circulation-amount controller may control a rotation frequency of the hydrogen pump when the determination portion determines that the boil-off gas is provided to the hydrogen circulation system. In this case, even if the boil-off gas is provided to the hydrogen circulation system, it is possible to provide a required amount of the hydrogen for the electrical generation in the fuel cell to the anode, with a control of the rotation frequency of the hydrogen pump. The hydrogen-circulation-amount controller may control the hydrogen pump so that the rotation frequency of the hydrogen pump is reduced when the determination portion determines that the boil-off gas is provided to the hydrogen circulation system. In this case, it is restrained that an excessive amount of the hydrogen is provided to the fuel cell.

The fuel cell system may include a trouble determination portion that determines that the storage portion is troubled when the value detected by the pressure detection portion is more than the threshold value for more than a given time. In this case, it is not determined that the storage portion is troubled, when the value detected by the pressure detection portion is not more than the threshold value for the given time. It is, therefore, determined whether the boil-off gas is generated briefly or continuously.

The storage portion may have a liquid-vaporizing portion. The fuel cell system may include a controller that controls an operation of the liquid-vaporizing portion and that stops the operation of the liquid-vaporizing portion when the trouble determination portion determines that the storage portion is troubled. In this case, it is restrained that a great amount of the liquid hydrogen vaporizes. And the unexpected consumption of the hydrogen is restrained.

EFFECTS OF THE INVENTION

In accordance with the present invention, it is not necessary to provide a treatment device such as a diluting device of the boil-off gas exhausting to the outside. Accordingly, the structure of the fuel cell system is simplified. An unexpected consumption of the hydrogen is restrained. The energy efficiency of the fuel cell system is improved.

BEST MODES FOR CARRYING OUT THE INVENTION

First Embodiment

Figure 1:
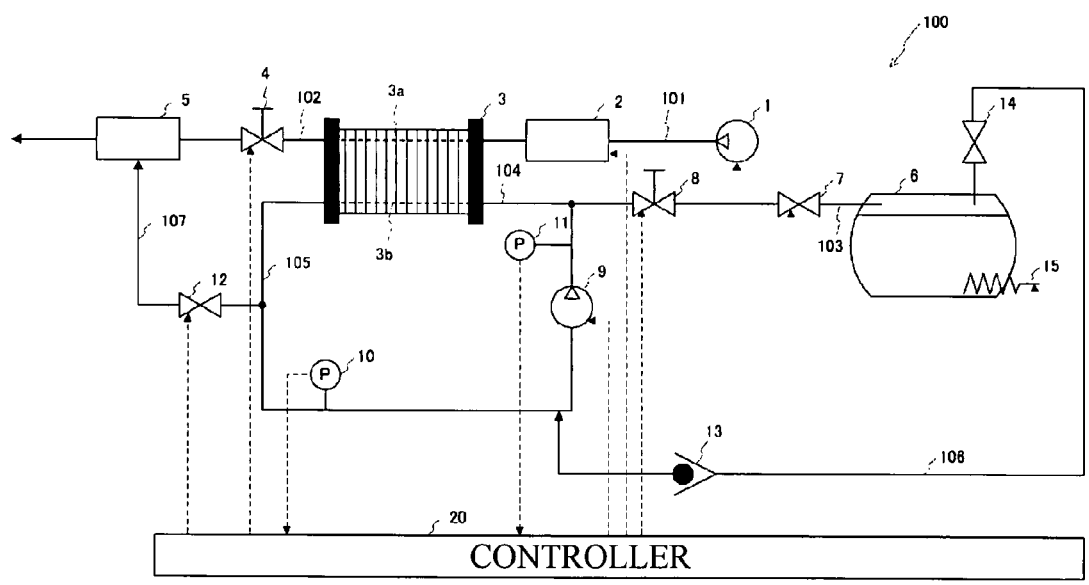
FIG. 1 illustrates a block diagram of an overall configuration of a fuel cell system in accordance with a first embodiment.

FIG. 1 illustrates a block diagram of an overall configuration of a fuel cell system 100 in accordance with a first embodiment. As shown in FIG. 1, the fuel cell system 100 has an air pump 1, a humidifying device 2, a fuel cell 3, pressure control valves 4 and 8, a diluting device 5, a liquid hydrogen tank 6, a main valve 7, a hydrogen pump 9, pressure sensors 10 and 11, a hydrogen-exhaust valve 12, a check valve 13, a safety valve 14, a heater 15 and a controller 20. The fuel cell 3 has a cathode 3a and an anode 3b.

The air pump 1 is coupled to an inlet of the cathode 3a of the fuel cell 3 through a pipe 101. The pipe 101 passes through the humidifying device 2. An outlet of the cathode 3a is coupled to the diluting device 5 through a pipe 102. The pipe 102 passes through the pressure control valve 4.

The heater 15 is housed in the liquid hydrogen tank 6. The liquid hydrogen tank 6 is coupled to an inlet of the anode 3b of the fuel cell 3 through pipes 103 and 104. The pipe 103 passes through the main valve 7 and the pressure control valve 8 in order from the liquid hydrogen tank 6 side. A first end of the pipe 104 is coupled to the pipe 103. A second end of the pipe 104 is coupled to the inlet of the anode 3b. An outlet of the anode 3b is coupled to the pipe 104 through a pipe 105.

The pipe 105 passes through the hydrogen pump 9. In the pipe 105, the pressure sensor 10 is provided between the hydrogen pump 9 and the outlet of the anode 3b, and the pressure sensor 11 is provided between the hydrogen pump 9 and the pipe 104. A pipe 107 couples the middle of the pipe 105 and the diluting device 5. The pipe 105 is coupled to the pipe 107 at a point between the outlet of the anode 3b and the pressure sensor 10. The pipe 107 passes through the hydrogen-exhaust valve 12. The diluting device 5 is leading outside.

The liquid hydrogen tank 6 is further coupled to the middle of the pipe 105 through a pipe 106. The pipe 106 passes through the safety valve 14 and the check valve 13 in order from the liquid hydrogen tank 6 side. The pipe 105 is coupled to the pipe 106 at a point between the pressure sensor 10 and the hydrogen pump 9.

The controller 20 has a central processing unit (CPU), a read only memory (ROM) and so on. The controller 20 receives detection results from the pressure sensors 10 and 11, and controls the air pump 1, the humidifying device 2, the pressure control valves 4 and 8, the main valve 7, the hydrogen pump 9, the hydrogen-exhaust valve 12 and the heater 15.

Next, a description will be given of an operation of the fuel cell system 100. The air pump 1 receives an instruction from the controller 20, and provides a required amount of air to the humidifying device 2 through the pipe 101. The humidifying device 2 receives an instruction from the controller 20, and controls the humidity of the air. The air, of which humidity is controlled by the humidifying device 2, is provided to the cathode 3a through the pipe 101.

In the fuel cell 3, water and electric power are generated from the protons converted at the anode 3b described later and the oxygen included in the air that is provided to the cathode 3a. The water thus generated evaporates into steam vapor with the reaction heat of the protons and the oxygen. The steam vapor generated at the cathode 3a and the air that does not react with the protons are provided to the diluting device 5 through the pipe 102, as cathode-off gas. The pressure control valve 4 receives an instruction from the controller 20, and controls the pressure of the cathode-off gas provided to the diluting device 5 from the cathode 3a.

The liquid hydrogen tank 6 is covered with a heat insulating material, and stores liquid hydrogen as a fuel for the fuel cell 3. The heater 15 receives an instruction from the controller 20, and controls the temperature of the liquid hydrogen tank 6. Therefore, a required amount of the liquid hydrogen evaporates. The hydrogen vaporized in the liquid hydrogen tank 6 is provided to the anode 3b through the pipes 103 and 104. The main valve 7 receives an instruction from the controller 20, and opens and closes the pipe 103. Therefore, the controller 20 can control the supply of the hydrogen vaporized in the liquid hydrogen tank 6 to the anode 3b. The pressure control valve 8 receives an instruction from the controller 20, and controls the pressure of the hydrogen provided to the anode 3b from the liquid hydrogen tank 6. Therefore, the controller 20 can control the amount of the hydrogen provided to the anode 3b from the liquid hydrogen tank 6.

At the anode 3b, the hydrogen is converted into protons. The hydrogen that is not converted to protons is provided to the hydrogen pump 9 through the pipe 105, as anode-off gas. The hydrogen pump 9 is a type of such as a scroll pump or a screw pump, and provides the anode-off gas to the anode 3b through the pipes 105 and 104. The pressure sensor 10 detects the pressure of the anode-off gas flowing in the pipe 105, and gives the detected result to the controller 20. The pressure sensor 11 detects the pressure of the anode-off gas compressed by the hydrogen pump 9, and gives the detected result to the controller 20.

The hydrogen-exhaust valve 12 receives an instruction from the controller 20, and opens and closes the pipe 107. Therefore, the controller 20 controls the exhausting of the anode-off gas flowing in the pipe 105 to the diluting device 5. In this case, it is possible to exhaust nitrogen and so on flowing into the anode 3b from the cathode 3a. The diluting device 5 oxidizes the cathode-off gas from the cathode 3a and the anode-off gas from the anode 3b, and exhausts the oxidized gas to the outside of the fuel cell system 100.

The safety valve 14 provides the hydrogen in the liquid hydrogen tank 6 into the pipe 106 as boil-off gas, when the pressure in the liquid hydrogen tank 6 is more than a given value. Therefore, it is restrained that the pressure in the liquid hydrogen tank 6 is excessive. The hydrogen provided to the pipe 106 is provided to the pipe 105. The check valve 13 allows that the hydrogen flows into the pipe 105 from the liquid hydrogen tank 6, and forbids that the hydrogen flows into the liquid hydrogen tank 6 from the pipe 105. Therefore, it is possible to restrain the corrosion of the safety valve 14 caused by the steam and so on included in the anode-off gas.

The temperature reduction of the fuel cell 3 caused by the boil-off gas is restrained, because the boil-off gas is provided to the anode 3b through the pipes 105 and 104. Therefore, the fuel cell system 100 in accordance with the embodiment is more effective when the fuel cell 3 generates electrical power.

In the fuel cell system 100 in accordance with the embodiment, the pipes 104 and 105 and the anode 3b form a sealed space. And it is restrained that the boil-off gas is exhausted to the outside. Therefore, it is not necessary to provide another treatment device such as diluting device of the boil-off gas exhausting to the outside. Accordingly, the structure of the fuel cell system 100 is simplified. The volume of the sealed space formed by the pipes 104 and 105 and the anode 3b may be set a preferable value when the fuel cell system is designed, although the volume is approximately 3 to 4 liters in the embodiment.

The fuel cell 3 can use the boil-off gas for a fuel for the electrical power generation when the fuel cell 3 generates the electrical power. In this case, the controller 20 controls the hydrogen pump 9 so that the rotation frequency of the hydrogen pump 9 is reduced. Therefore, it is possible to restrain an unexpected operation of the hydrogen pump 9 and an unexpected consumption of the liquid hydrogen. Accordingly, the energy efficiency of the fuel cell system 100 is improved. Details are mentioned later.

It is possible to shut away the boil-off gas in the sealed space formed by the pipes 104 and 105 and the anode 3b, when the fuel cell 3 does not generate the electrical power. And the fuel cell 3 can use the boil-off gas as a fuel at next time of the electrical generation. It is, therefore, possible to restrain the unexpected consumption of the liquid hydrogen. Accordingly, it is possible to restrain the reduction of the energy efficiency of the fuel cell system 100.

It is possible to control the amount of the hydrogen provided to the anode 3b with a control of the rotation frequency of the hydrogen pump 9, because the boil-off gas is provided to the pipe 105 on the upstream side of the hydrogen pump 9.

The hydrogen pump 9 provides the anode-off gas to the anode 3b in the embodiment. Other supply portions such as a variable ejector may be provided instead of the hydrogen pump 9. The fuel cell 3 is not limited to the case of the embodiment, when the fuel cell 3 uses the hydrogen gas as a fuel gas. Another pressure sensor may be provided in the pipe 106 on the upstream side of the check valve 13 and may detect the influx of the boil-off gas.

The pressure sensor 11 detects the influx of the boil-off gas into the pipe 106 in the embodiment. A flow meter may detect the influx of the boil-off gas into the pipe 106. In this case, the flow meter may be provided on the upstream side of the check valve 13 in the pipe 106 or the flow meter may be provided instead of the pressure sensor 11. And the flow meter may detect the influx of the boil-off gas into the pipe 106.

Figure 2:
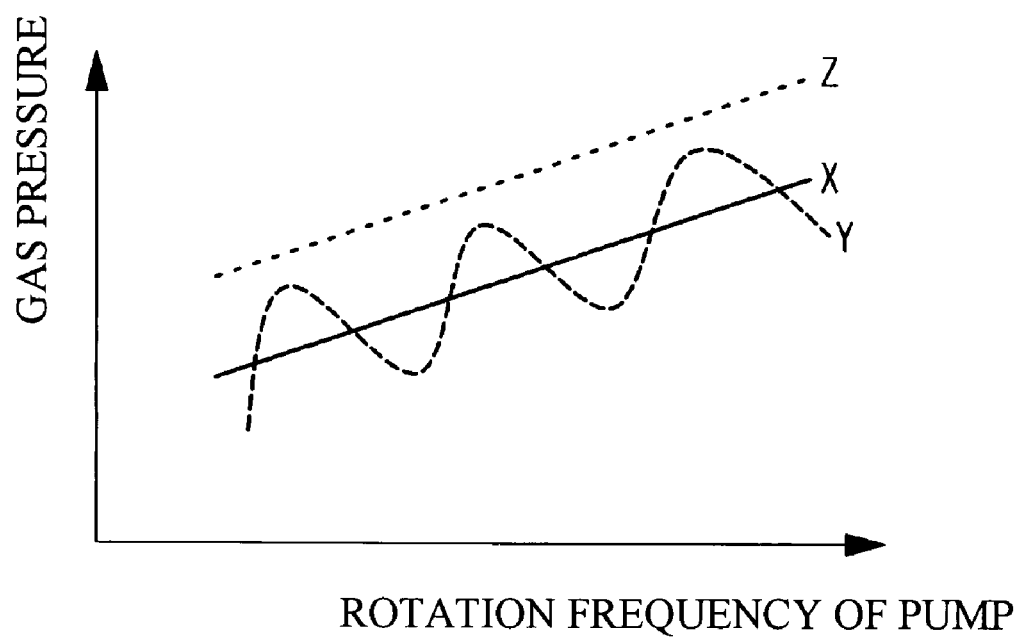
FIG. 2 illustrates gas pressure detected by a pressure sensor.

Next, a description will be given of the pressure of the gas flowing in the pipe 105. FIG. 2 illustrates the gas pressure detected by the pressure sensor 11. The vertical axis of FIG. 2 indicates the gas pressure detected by the pressure sensor 11. The horizontal axis of FIG. 2 indicates the rotation frequency of the hydrogen pump 9.

As is shown by a solid line X of FIG. 2, the gas pressure in the pipe 105 increases according to the increase of the rotation frequency of the hydrogen pump 9. The solid line X indicates a theoretical figure calculated from the amount of the hydrogen required for the electrical generation of the fuel cell 3 and the rotation frequency of the hydrogen pump 9. Accordingly, the rotation frequency of the hydrogen pump 9 is proportional to the gas pressure in the pipe 105 in the solid line X. However, as is shown by a dotted line Y of FIG. 2, the gas pressure in the pipe 105 is dispersed because of a disperse of the compression efficiency of the hydrogen pump 9 and so on. A dotted line Z in FIG. 2 indicates a maximum of the gas pressure in the pipe 105 with respect to the rotation frequency of the hydrogen pump 9 calculated when the disperse of the compression efficiency of the hydrogen pump 9 is taken into account. Therefore, the boil-off gas flows into the pipe 105 when the gas pressure detected by the pressure sensor 11 is above the dotted line Z. Accordingly, it is possible to detect the influx of the boil-off gas into the pipe 105 with the dotted line Z of FIG. 2.

Figure 3:
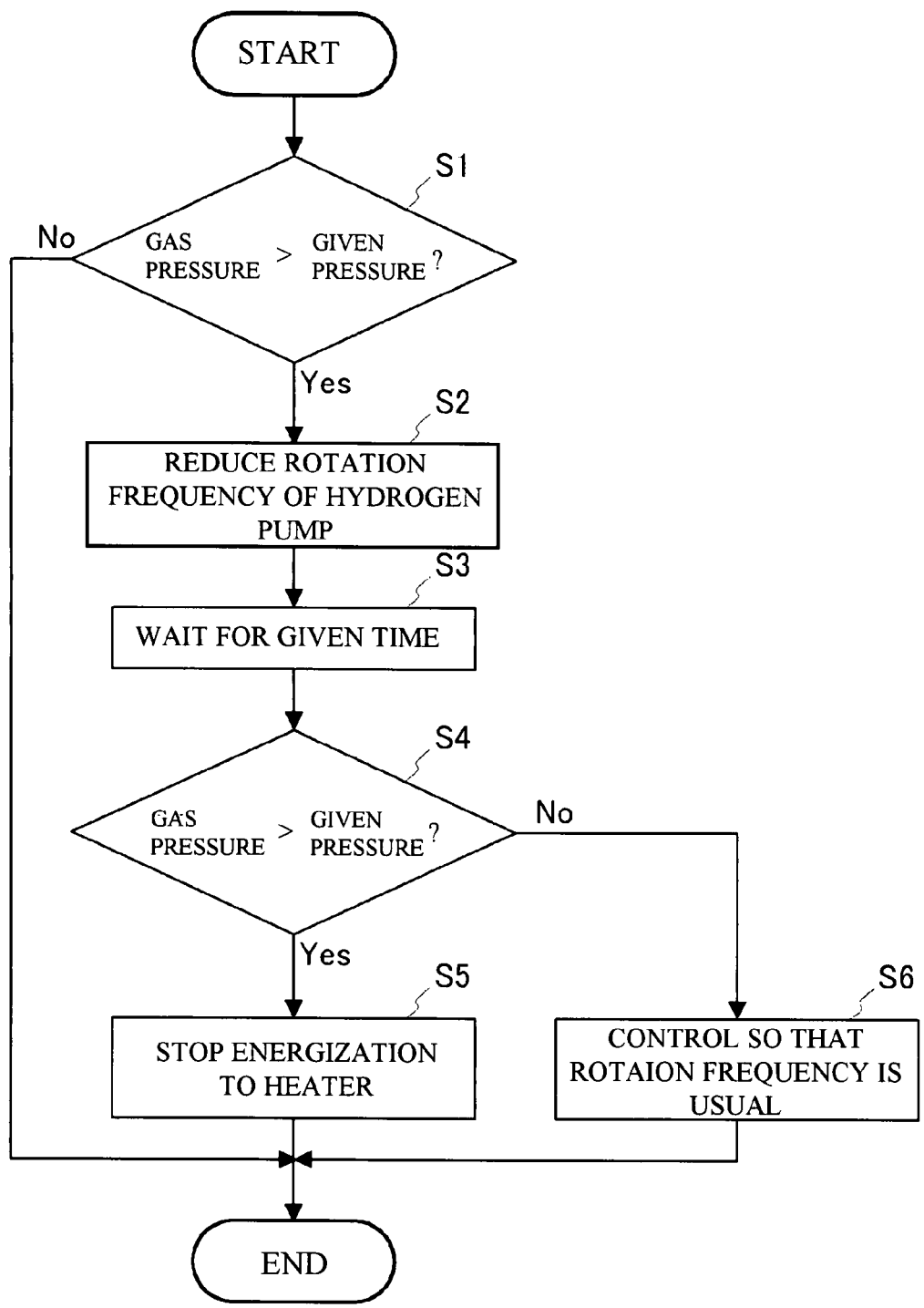
FIG. 3 illustrates a flowchart of an exemplary control sequence of a controller in a case where boil-off gas is provided to a pipe.

Next, a description will be given of an operation of the controller 20 in a case where the boil-off gas is provided to the pipe 105. FIG. 3 illustrates a flowchart of an exemplary control sequence of the controller 20 in the case where the boil-off gas is provided to the pipe 105. The controller 20 repeats the operation at a given interval (for example, a few milliseconds).

As shown in FIG. 3, the controller 20 determines whether the gas pressure in the pipe 105 is more than a given pressure (step S1). In particular, the controller 20 may determine based on the detection result of the pressure sensor 11 and the dotted line Z of FIG. 2.

When it is determined that the gas pressure in the pipe 105 is more than the given pressure in step S1, the controller 20 controls the hydrogen pump 9 so that the rotation frequency of the hydrogen pump 9 gets lower (step S2). Next, the controller 20 waits for a given time, for example, five seconds (step S3). Next, the controller 20 determines whether the gas pressure in the pipe 105 is more than a given pressure (step S4). In particular, the controller 20 may determine based on the detection result of the pressure sensor 11 and the dotted line Z of FIG. 2.

When it is determined that the gas pressure in the pipe 105 is more than the given pressure in step S4, the controller 20 stops energization to the heater 15 (step S5). After that, the controller 20 starts the sequence over from step S1.

When it is not determined that the gas pressure in the pipe 105 is more than the given pressure in step S4, the controller 20 controls the hydrogen pump 9 so as to rotate at a usual frequency (step S6). After that, the controller 20 starts the sequence over from step S1.

When it is not determined that the gas pressure in the pipe 105 is more than the given pressure in step S1, the controller 20 starts the sequence over from step S1.

As mentioned above, it is determined whether the boil-off gas is flows into the pipe 105, following the flowchart above. When the boil-off gas flows into the pipe 105, the excessive provision of the hydrogen into the fuel cell 3 is restrained with the reduction of the rotation frequency of the hydrogen pump 9. Therefore, the unexpected consumption of the hydrogen is restrained, and the unexpected operation of the hydrogen pump 9 is restrained. Accordingly, the system efficiency of the fuel cell system 100 is improved.

In addition, it is determined whether the boil-off gas is generated briefly or continuously, because it is determined whether the boil-off gas flows into the pipe 105 for more than a given time. Therefore, a trouble of the heater 15 is detected rapidly. It is, therefore, restrained that a great amount of the liquid hydrogen vaporizes. And the unexpected consumption of the hydrogen is restrained.

In a case where the boil-off gas does not flow into the pipe 105 for more than a given time, the hydrogen pump 9 rotates at the usual frequency without a stop of the operation of the heater 15. And the fuel cell 3 continues the electrical power generation stably.

The embodiment above includes but not limited to the case where it is determined that the heater 15 is troubled when it is determined that the gas pressure in the pipe 105 is more than the given pressure in step S4. For example, it may be determined that a heat insulation failure occurs in the liquid hydrogen tank 6, and it may be determined that the safety valve 14 is troubled.

In the embodiment, the liquid hydrogen tank 6 corresponds to the storage portion. The main valve 7 corresponds to the fuel supply portion. The pipes 104 and 105 and the anode 3b correspond to the hydrogen circulation system. The safety valve 14 corresponds to the boil-off gas supply portion. The hydrogen pump 9 corresponds to the hydrogen circulating portion. The controller 20 corresponds to the hydrogen-circulation-amount controller, the determination portion, the trouble determination portion and the controller. The pressure sensor 11 corresponds to the pressure detection portion. The heater 15 corresponds to the liquid-vaporizing portion. The safety valve 14 corresponds to the first valve. The check valve 13 corresponds to the second valve. The hydrogen-exhaust valve 12 corresponds to the exhaust portion.

Second Embodiment

Figure 4:
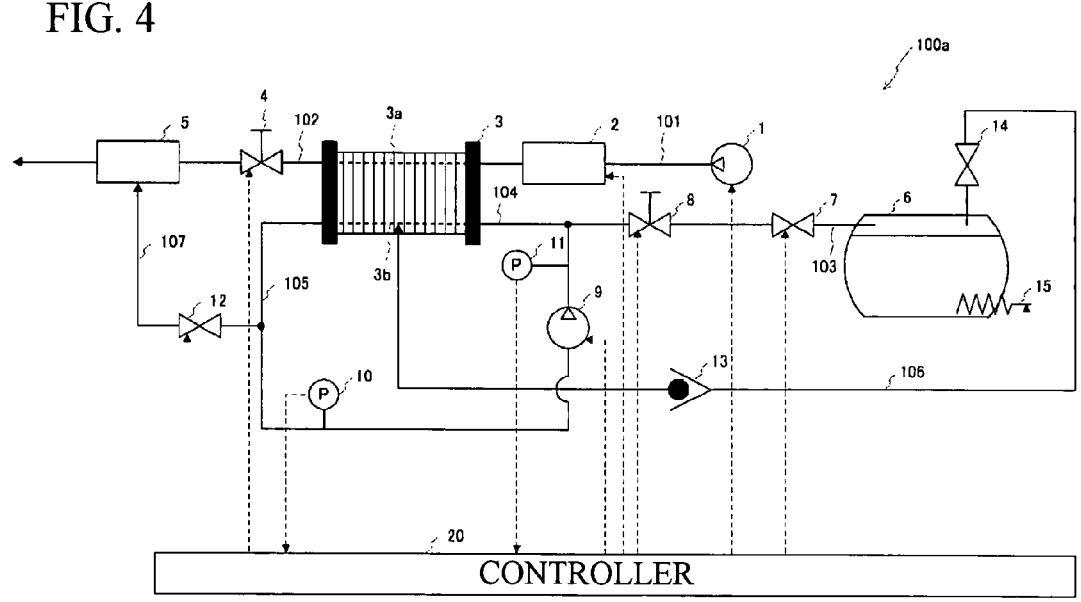
FIG. 4 illustrates block diagram of an overall configuration of a fuel cell system in accordance with a second embodiment.

FIG. 4 illustrates a block diagram of an overall configuration of a fuel cell system 100a in accordance with a second embodiment. In the fuel cell system 100a, the pipe 106 is not coupled to the pipe 105 but is coupled to the middle of the anode 3b, being different from the fuel cell system 100 shown in FIG. 1.

The hydrogen provided to the anode 3b is used for the electrical power generation, as the hydrogen flows at the anode 3b. And the density of the hydrogen is reduced near the outlet of the anode 3b. Accordingly, the electrical power is not equally generated in the fuel cell 3.

The boil-off gas is provided to the middle of the anode 3b in the embodiment. And the reduction of the hydrogen density is restrained on the outlet side of the anode 3b. Accordingly, the electrical power is generated substantially equally at every area of the fuel cell 3. The coupling position of the pipe 106 and the anode 3b is not limited when the pipe 106 is coupled to the middle of the anode 3b.

It is restrained that the boil-off gas is exhausted to the outside, in the fuel cell system 100a in accordance with the embodiment. It is, therefore, not necessary to provide another treatment device such as diluting device of the boil-off gas exhausting to the outside. Accordingly, the structure of the fuel cell system 100a is simplified. It is possible to shut away the boil-off gas in the sealed space formed by the pipes 104 and 105 and the anode 3b, when the fuel cell 3 does not generate the electrical power. And the fuel cell 3 can use the boil-off gas as a fuel at next time of the electrical generation. It is, therefore, possible to restrain the loss of the hydrogen. Accordingly, it is possible to restrain the reduction of the energy efficiency of the fuel cell system 100a.

The invention claimed is:
1. A fuel cell system comprising:
a storage portion that stores liquid hydrogen;
a fuel cell that uses hydrogen gas as fuel gas;
a fuel supply portion that provides hydrogen gas to an anode of the fuel cell, the hydrogen gas being generated caused by a vaporization of the liquid hydrogen stored in the storage portion;
a hydrogen circulation system in fluid communication with the anode of the fuel cell and the fuel supply portion, and which comprises a hydrogen pump that circulates the hydrogen in the hydrogen circulation system;
a boil-off gas supply portion, in fluid communication with both the storage portion and the circulation system, that provides boil-off gas generated in the storage portion to the hydrogen circulation system,
a pressure detection portion that detects a pressure in the hydrogen circulation system;
a determination portion that determines whether the boil-off gas is provided to the hydrogen circulation system when a value detected by the pressure detection portion is more than a threshold value; and
a hydrogen-circulation-amount controller that reduces a rotation frequency of the hydrogen pump when the determination portion determines that the boil-off gas is provided to the hydrogen circulation system;
wherein the boil-off gas supply portion is in fluid communication with the hydrogen circulation system at a point along the hydrogen circulation system upstream of an inlet of the anode of the fuel cell, and wherein the storage portion includes a storage tank having two separate supply paths: the fuel supply portion and the boil-off gas supply portion.

2. The fuel cell system as claimed in claim 1, wherein the boil-off gas supply portion has a first valve that provides the boil-off gas to the hydrogen circulation system when a pressure of the boil-off gas is more than a threshold value.

3. The fuel cell system as claimed in claim 1, wherein the boil-off gas supply portion has a second valve that restrains a reflux of the boil-off gas into the storage portion from the hydrogen circulation system.

4. The fuel cell system as claimed in claim 1, wherein a position of the hydrogen circulation system where the boil-off gas is provided to the hydrogen circulation system from the boil-off gas supply portion is upstream of the hydrogen circulating portion in the hydrogen circulation system and is downstream of the anode.

5. The fuel cell system as claimed in claim 1, wherein the hydrogen circulation system has an exhaust portion that is provided upstream of the hydrogen circulating portion and downstream of the anode and that exhausts a gas in the hydrogen circulation system.

6. The fuel cell system as claimed in claim 5, wherein a position of the hydrogen circulation system where the boil-off gas is provided to the hydrogen circulation system from the boil-off gas supply portion is upstream of the hydrogen circulating portion and is downstream of the exhaust portion.

7. The fuel cell system as claimed in claim 1, wherein a position of the hydrogen circulation system where the boil-off gas is provided to the hydrogen circulation system from the boil-off gas supply portion is middle of the anode.

8. The fuel cell system as claimed in claim 1, wherein the pressure detection portion is provided downstream of the hydrogen circulating portion and upstream of the anode.

9. The fuel cell system as claimed in claim 1, further comprising a trouble determination portion that determines that the storage portion is troubled when the value detected by the pressure detection portion is more than the threshold value for more than a given time.

10. The fuel cell system as claimed in claim 9, wherein:
the storage portion has a liquid-vaporizing portion; and
the fuel cell system has a controller that controls an operation of the liquid-vaporizing portion and stops the operation of the liquid-vaporizing portion when the trouble determination portion determines that the storage portion is troubled.

* * * * *